United States Patent
Putrams

(10) Patent No.: US 12,540,603 B2
(45) Date of Patent: Feb. 3, 2026

(54) METHOD FOR WIND TURBINE BLADE MECHANICAL DE-ICING WITH A LINE

(71) Applicant: AERONES, Inc., San Jose, CA (US)

(72) Inventor: Janis Putrams, Riga (LV)

(73) Assignee: AERONES AMERICA LLC, San Jose, CA (US)

( * ) Notice: Subject to any disclaimer, the term of this patent is extended or adjusted under 35 U.S.C. 154(b) by 0 days.

(21) Appl. No.: 18/843,080

(22) PCT Filed: Mar. 2, 2023

(86) PCT No.: PCT/IB2023/051947
§ 371 (c)(1),
(2) Date: Aug. 30, 2024

(87) PCT Pub. No.: WO2023/166458
PCT Pub. Date: Sep. 7, 2023

(65) Prior Publication Data
US 2025/0179993 A1      Jun. 5, 2025

Related U.S. Application Data

(60) Provisional application No. 63/315,543, filed on Mar. 2, 2022.

(51) Int. Cl.
*F03D 80/40*     (2016.01)
*B64U 10/60*     (2023.01)
(Continued)

(52) U.S. Cl.
CPC ............ *F03D 80/40* (2016.05); *B64U 10/60* (2023.01); *F03D 7/0224* (2013.01); *B64D 15/16* (2013.01);
(Continued)

(58) Field of Classification Search
CPC .......... B64D 15/16; F03D 80/55; H02G 7/16; B64F 5/20
See application file for complete search history.

(56) References Cited

U.S. PATENT DOCUMENTS 7,811,673 B2 * 10/2010 Sakamoto ................. D01F 6/04
                                                       428/394
8,192,163 B2 *  6/2012 Siebers ................... F03D 80/55
                                                       416/223 R
(Continued)

FOREIGN PATENT DOCUMENTS

CN      113595007 A  * 11/2021 ............... H02G 7/16
CN      114056569 A     2/2022
(Continued)

OTHER PUBLICATIONS

Mountain CFI, "Removing Frost from the Wings", Jan. 21, 2005; p. 1; (Year: 2005).*

(Continued)

*Primary Examiner* — Courtney D Heinle
*Assistant Examiner* — Esley Le Fisher
(74) *Attorney, Agent, or Firm* — Brooks Kushman P.C.

(57) ABSTRACT

The disclosure relates to the methods and devices for wind turbine blade mechanical de-icing. The proposed method for de-icing of a wind turbine blade, includes the steps of positioning a wind turbine blade in a substantially horizontal position; pulling a line one over the wind turbine blade; and pulling both ends of the line one sideways parallel to the wind turbine blade. The line one can be provided with a line two attached to it and the method may further include the step of pulling up a joint connecting the lines one and two to the leading edge and using the line one to slide the joint position over the leading edge of the blade. According to an embodiment an elastic sliding plate configured to prevent line entanglement may be attached at the line one and two joint position.

8 Claims, 3 Drawing Sheets

(51) Int. Cl.
  *F03D 7/02* (2006.01)
  *F03D 80/55* (2016.01)
  *B64D 15/16* (2006.01)
  *B64F 5/20* (2017.01)
  *B64U 101/29* (2023.01)

(52) U.S. Cl.
  CPC ............ *B64F 5/20* (2017.01); *B64U 2101/29* (2023.01); *F03D 80/55* (2016.05); *F05B 2260/70* (2013.01)

(56) References Cited

U.S. PATENT DOCUMENTS

| | | | | |
|---|---|---|---|---|
| 9,574,549 | B2* | 2/2017 | Lee | ............................ B08B 7/04 |
| 2007/0148452 | A1* | 6/2007 | Sakamoto | ................. D01F 6/04 |
| | | | | 428/375 |
| 2015/0135459 | A1* | 5/2015 | Lee | ......................... F03D 17/00 |
| | | | | 901/44 |
| 2015/0217841 | A1* | 8/2015 | Mohr | ...................... B63B 59/08 |
| | | | | 134/6 |
| 2020/0246840 | A1* | 8/2020 | Crunk | ....................... B08B 3/02 |
| 2021/0324834 | A1 | 10/2021 | Guzzo et al. | |

FOREIGN PATENT DOCUMENTS

| | | |
|---|---|---|
| EP | 2752621 A2 | 7/2014 |
| EP | 3312418 A1 | 4/2018 |

OTHER PUBLICATIONS

English translation of CN113595007A (Year: 2021).*
Youtube video, user: dexterhobnob; "ryanair aeroplane ice removal with rope", Mar. 16, 2009 (Year: 2009).*
NASA; "Module IV—De-Icing Operations", Sep. 27, 2016; see pp. 6-7; (Year: 2016).*
International Search report for PCT/IB2023/051947, prepared by the European Patent Office, mailing date May 31, 2023, 3 pages.

* cited by examiner

METHOD FOR WIND TURBINE BLADE MECHANICAL DE-ICING WITH A LINE

CROSS-REFERENCE TO RELATED APPLICATION

This application is the U.S. national phase of PCT Application No. PCT/IB2023/051947 filed on Mar. 2, 2023, which claims the benefit of U.S. Provisional Patent Application No. 63/315,543 filed on Mar. 2, 2022, the disclosures of which are incorporated in their entirety by reference herein.

FIELD OF THE INVENTION

The present invention relates to the wind turbines and wind turbine blades' maintenance methods and devices, in particular, to the methods and devices for wind turbine blade mechanical de-icing.

BACKGROUND OF THE INVENTION

Wind turbine blade icing is a common problem that occurs in cold and humid environments where the temperature drops below freezing. When this happens, the moisture in the air can freeze on the surface of the turbine blades, causing ice to accumulate. Icing adds additional weight to the blades, creates imbalance, may cause the blades to bend or deform. Therefore, in most cases the turbine needs to be stopped. Even if the icing is mild and turbine could continue to rotate it will lose efficiency because the aerodynamics of the blade is changed. There is additional danger if the turbine is located close to populated areas or roads. An ice block may break off and wind turbine may throw it with the rotational centrifugal force.

To mitigate the effects of icing, wind turbine manufacturers use various strategies. One approach is to design the blades with ice-phobic coatings or materials that reduce ice build-up. Another is to incorporate de-icing systems, such as heating elements or mechanical devices that remove ice from the blades.

However all known solutions have some weaknesses. Building heating elements inside the blade is expensive, attracts lightning, and consumes a lot of energy when used. Blowing hot air also requires a lot of energy. Use of ice-phobic coating on the blade does give some improvement but still does not solve the problem completely.

Therefore there is a need in effective inexpensive solution, which would allow quick de-icing of the wind turbine blades.

BRIEF SUMMARY OF THE INVENTION

The goal of the invention is to provide an effective inexpensive solution, which would allow quick de-icing of the wind turbine blades.

The set goal is reached by the proposed method for de-icing of a wind turbine blade, comprising the steps of (i) positioning a wind turbine blade in a substantially horizontal position; (ii) positioning the wind turbine blade pitch with the leading edge pointing substantially upwards; (iii) pulling a line one over the wind turbine blade; and (iv) pulling both ends of the line one sideways parallel to the wind turbine blade.

The line one can be pulled over the wind turbine blade at the step (iii) using an unmanned aerial vehicle, which is adapted to carry a line and is caused to fly over the blade, pulling the line until it is in the desired position on the wind turbine blade.

The line one used may be composed by smoothly connecting various thickness segments or manufactured with progressive thickness increase, wherein the line one is pulled from the thin end over the blade until desired line thickness is achieved.

According to the preferred embodiment, pulling both line one ends at the step (iv) can be made starting from the wind turbine root and ending at the tip.

According to yet another embodiment, the line one, which is pulled over the wind turbine blade at the step (iii) can be provided with a line two attached to it and the method may further comprise the step (iii) of pulling up a joint connecting the lines one and two to the leading edge and using the line one to slide the joint position over the leading edge of the blade.

DETAILED DESCRIPTION OF THE INVENTION

The claimed method comprises a number of steps set forth further in details with references to the drawings.

According to the invention, a wind turbine is stopped in a position where one blade is substantially horizontally with leading edge pointing substantially upwards. In some cases, depending on terrain and severity of icing the tip of the blade can be left lower, i.e. downwards, or at an angle between these two positions.

Figure 1:
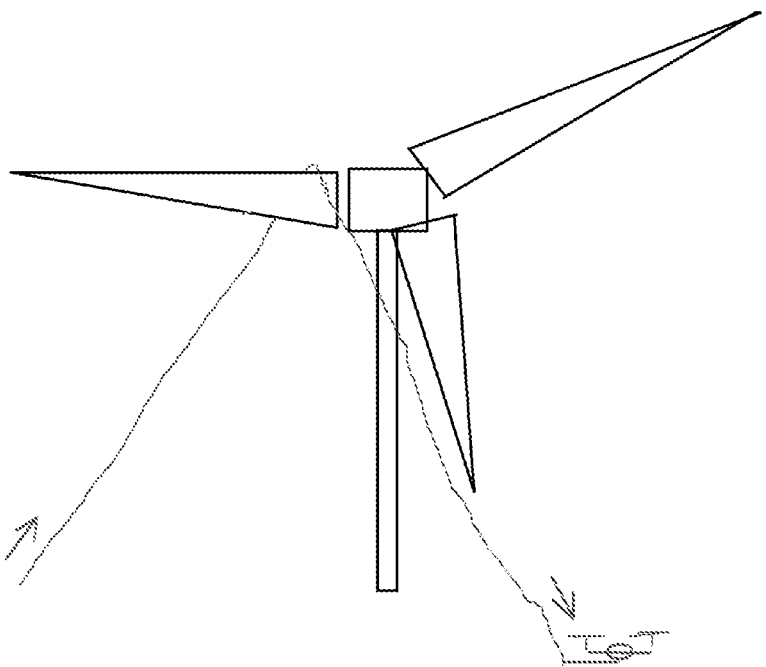
FIG. 1—shows an embodiment of using an unmanned aerial vehicle, flying over the wind turbine blade with a line.

A smooth line, possibly a nylon fishing monoline or other line or rope in diameter of about 0.1-5 mm can be attached to a drone, which may lift off from the downwind side of the wind turbine at a safe distance, carry the line over the wind turbine blade and land on the upwind side of the turbine at a safe distance from it. The line stays over the blade, preferably, close to the blade root (FIG. 1). Further, the end of the line can be disconnected from the drone on the ground and be connected for instance, to a winch.

On the other end of the line another line can be attached which is thicker and stronger than the first line but not too thick as to break the first one with its weight. The joint, such as a knot may be encapsulated to make the joint smoother and easier to slide.

Figure 2:
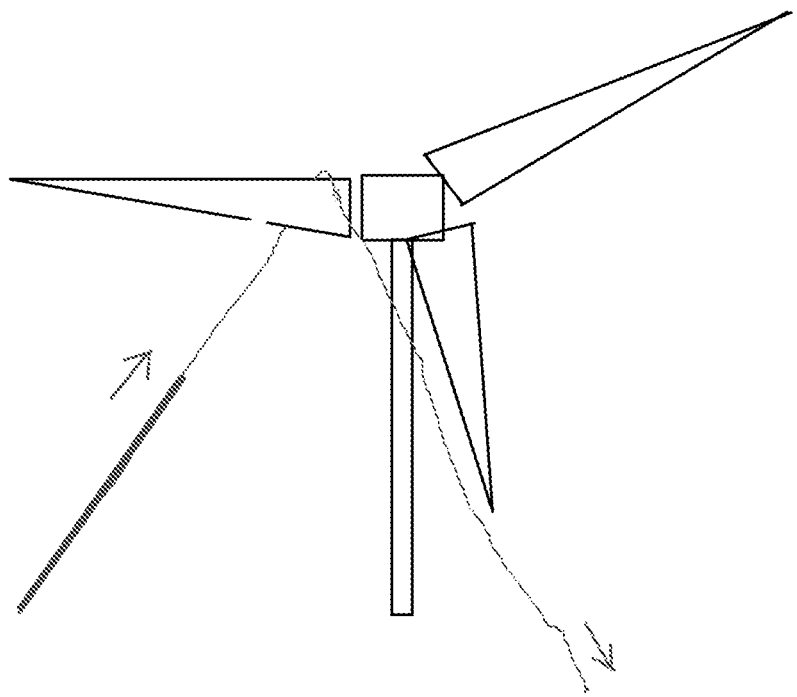
FIG. 2—shows an embodiment of using a thin line to pull up a thicker line for removing ice from the wind turbine blade.

The winch starts pulling and pulls the thicker line over the blade in the same position as the first one (FIG. 2). These steps can be repeated several times until the line that is over the blade is strong enough to carry a de-icing equipment. This could be e.g. a 3 mm nylon monoline which can hold about 300 kg of weight or equivalent means. As previously noted, the line as well as the knots needs to be smooth so that it does not damage the surface of the blade when it is being pulled over.

Further there are several options depending on the blade design as well as severity of the icing and if the ice-phobic coating has been applied on the wind turbine blade.

Figure 3:
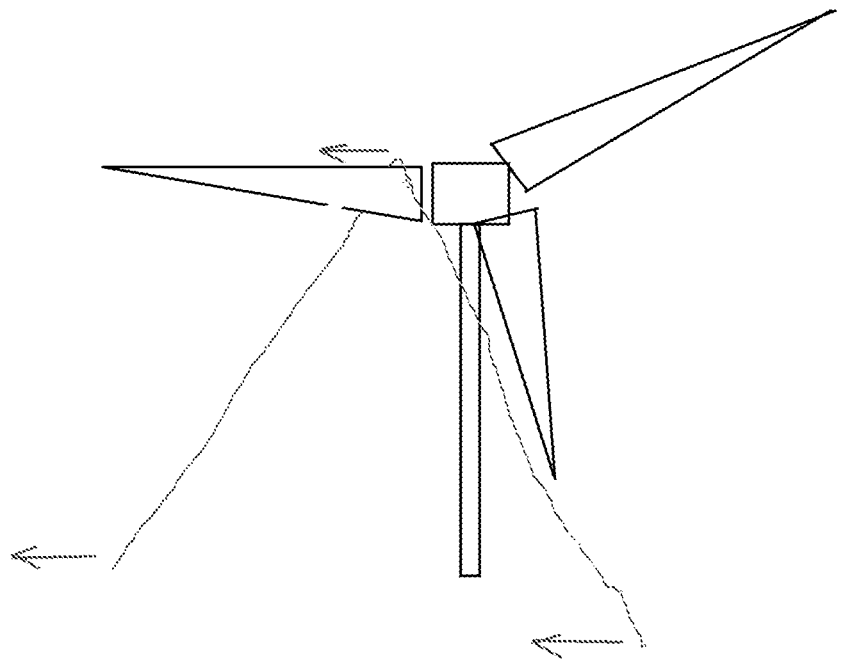
FIG. 3—shows an embodiment using both ends of the line to pull the line sideways, cleaning leading edge of the wind turbine blade from any ice.

If icing is minimal and blade does not have serrations, then both ends of the line one can be pulled away from the turbine parallel to the blade (FIG. 3). The line will slide over the leading edge and pull with it any ice that might have accumulated. When the line reaches the tip of the blade then it falls to the ground.

If icing is minimal but blade has serrations, then an elastic sliding plate can be attached at the line one and two joint position. The elastic sliding plate bends over the leading edge of the blade and covers the serrations, preventing line entanglement.

Figure 4:
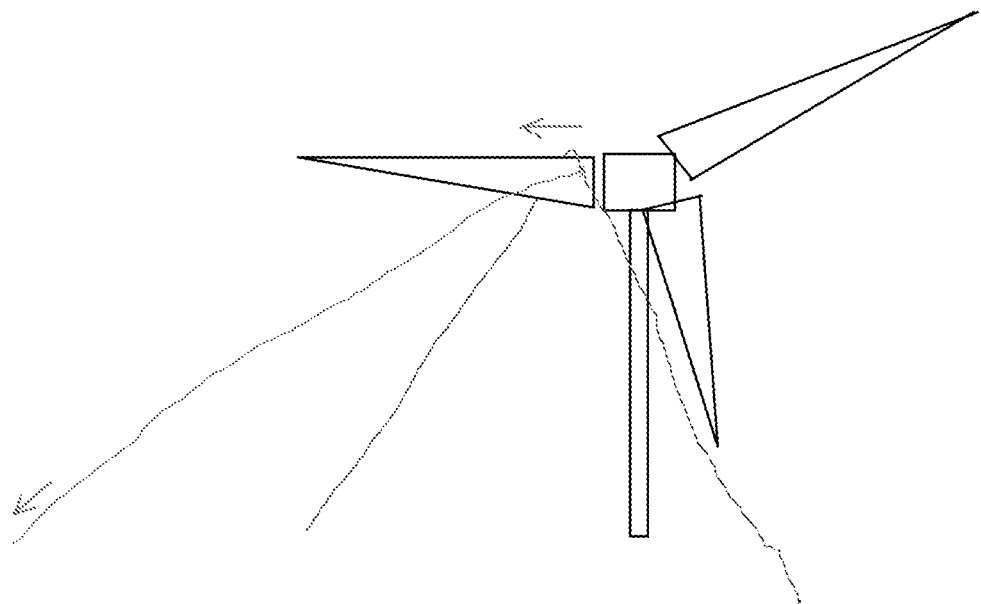
FIG. 4—shows an embodiment with an additional line attached to the ice cleaning line and used to facilitate cleaning the leading edge of the wind turbine blade.

If icing is more severe then it might not be possible to pull the line sideways or it would make a jerky movement. To avoid this another line (line two) may be connected to the line one and pulled up to the leading edge (FIG. 4). The two lines can be connected together in a joint using a knot, splicing, rope clamp, sewing, gluing or other equivalent means. It would create a setup where one end of the line is in the position where the drone took off, one end of the line is in the position where the drone landed, and the third end of the line is located at a safe distance from the turbine in a direction where the blade is pointing. The line two can also be attached to a winch and smoothly pulled in.

Figure 5:
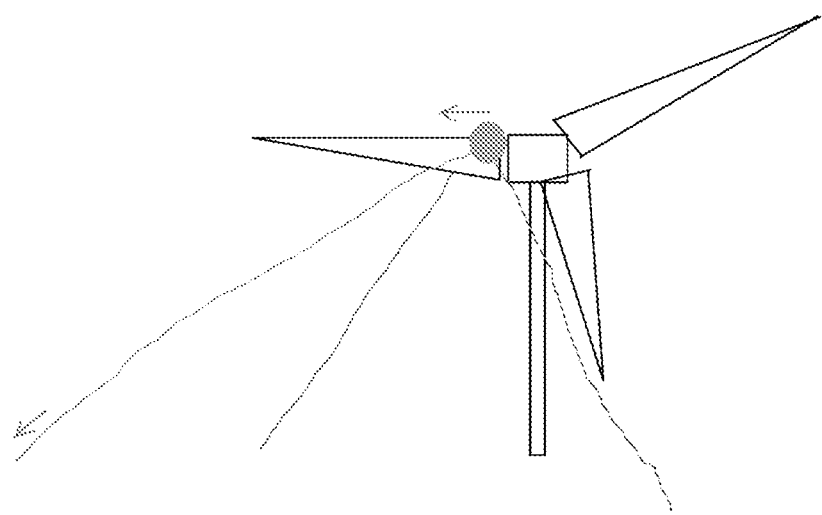
FIG. 5—shows an embodiment with a robot or a sliding plate pulled sideways to clean the blade from ice.

Additionally, to the previous setup an elastic plate can be attached at the joint position between lines one and two if the blade has serrations (FIG. 5).

If the icing is very severe or if faster ice removal is desired a cleaning means can be attached at the line one and two joint position (FIG. 5). The cleaning means may be a high-pressure hose with a nozzle, a steam cleaner, a cleaning robot, a rotatable brush, an ice scrapper, a heat lamp or an equivalent means.

Salty water or water with antifreeze can be used if the environmental temperature is below freezing. The high-pressure washer may have a heater that heats the water for accelerating icing removal. A rotating nozzle, multiple nozzles or remotely steerable nozzle can be used. In this case it might be advisable to lower the plate and nozzles to the ground slowly before pulling the line over the tip of the blade so they would not be damaged from the fall.

In some cases a custom robot can be used that gets pulled up in the same fashion that might have additional cameras, controls, heaters, actuators etc.

When de-icing of one blade is completed and the line is removed from the blade, the wind turbine is rotated to position the next blade in the same position and the whole process is repeated.

The invention claimed is:

1. A method for de-icing of a wind turbine blade, comprising:
    (i) positioning the wind turbine blade in a horizontal position;
    (ii) positioning a pitch of the wind turbine blade with a leading edge of the wind turbine blade pointing upwards;
    (iii) pulling a line one over the wind turbine blade, wherein a line two is connected to the line one at a joint position by a joint;
    (iii') pulling up the joint to the leading edge of the wind turbine blade and using the line one to slide the joint position over the leading edge of the wind turbine blade; and
    (iv) pulling both ends of the line one sideways parallel to the wind turbine blade.

2. The method of claim 1, wherein pulling the line one over the wind turbine blade at the step (iii) is made using an unmanned aerial vehicle, which is adapted to carry the line one and is caused to fly over the wind turbine blade, pulling the line one until the line one is in a desired position on the wind turbine blade.

3. The method of claim 1, wherein the line one is composed by smoothly connecting various thickness segments or manufactured with progressive thickness increase, wherein the line one is pulled over the wind turbine blade until a desired line thickness of the line one over the wind turbine blade is achieved.

4. The method of claim 1, wherein the pulling both ends of the line one at the step (iv) is made starting from a root of the wind turbine blade and ending at a tip of the wind turbine blade.

5. The method of claim 1, wherein at the step (ii) a tip of the wind turbine blade is positioned downwards.

6. The method of claim 1, wherein at the step (ii) a tip of the wind turbine blade is positioned at an angle between upward and downward position.

7. The method of claim 1, wherein an elastic sliding plate configured to prevent line entanglement is attached at the joint position.

8. The method of claim 1, wherein a cleaning means is attached at the joint position, wherein the cleaning means selected from the group consisting of a high-pressure hose with a nozzle, a steam cleaner, a cleaning robot, a rotatable brush, an ice scrapper, and a heat lamp.

* * * * *